Feb. 27, 1962      H. B. RICH      3,022,857
STEPLADDER
Filed May 24, 1960
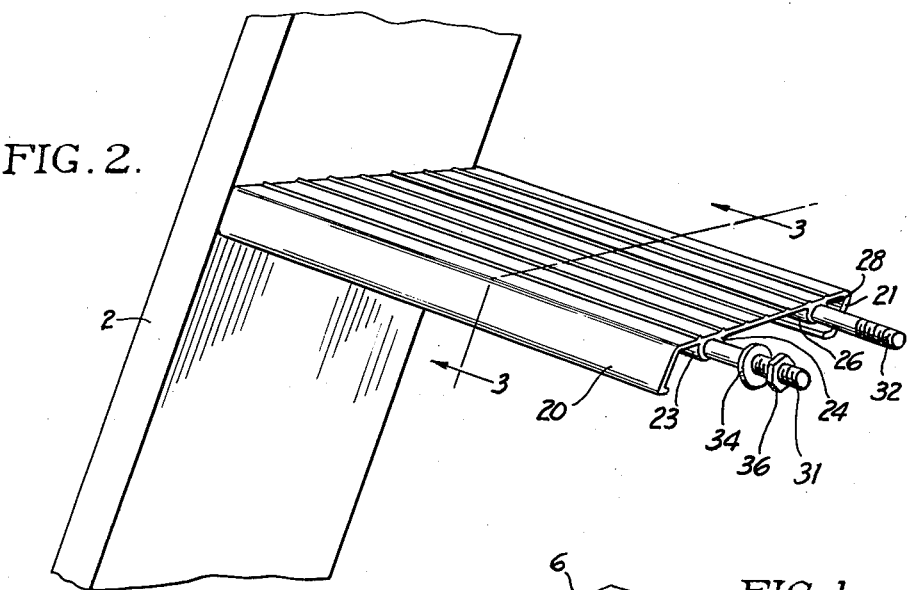
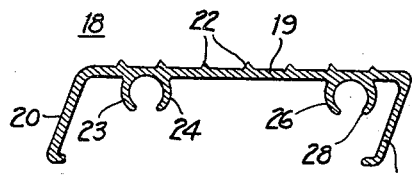
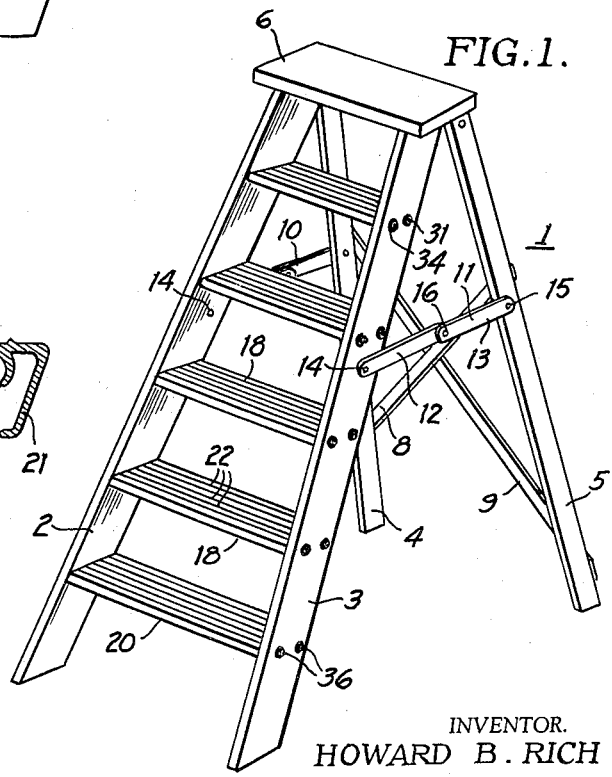
INVENTOR.
HOWARD B. RICH
BY
Pearce and Schaeperklaus
ATTORNEYS

United States Patent Office 3,022,857
Patented Feb. 27, 1962

3,022,857
STEPLADDER
Howard B. Rich, Carrollton, Ky., assignor to Howard B.
Rich, Inc., Carrollton, Ky., a corporation of Kentucky
Filed May 24, 1960, Ser. No. 31,369
1 Claim. (Cl. 182—222)

This invention relates to stepladders and to a step construction for a stepladder.

An object of this invention is to provide a sturdy, light weight, rigid step construction for a stepladder.

A further object of this invention is to provide a ladder having wood side rails and strong, sturdy steps of extruded metal, so constructed that the steps are safely and strongly secured to the side rails and in which the securing means which attaches the steps to the side rails serves also to reinforce and support the steps.

A further object of this invention is to provide a step construction for a stepladder of this type having a tread portion on the lower face of which are mounted downwardly extending pairs of parallel flanges which embrace and surround tension rods which link side rails of the ladder so that the tension rods underlie and support the tread portion.

The above and other objects and features of the invention will be apparent to those skilled in the art to which this invention pertains from the following detailed description, and the drawing, in which:

FIG. 1 is a perspective view of a stepladder constructed in accordance with an embodiment of this invention;

FIG. 2 is an enlarged perspective view showing a portion of one side rail and one step; and FIG. 3 is a view in section taken on the line 3—3 in FIG. 2, showing the step in transverse section, the step being removed from the ladder.

In FIG. 1 of the drawings is shown a collapsible stepladder 1 having side rails 2 and 3 hinge-connected at their upper ends to brace or stay legs 4 and 5. The upper end of the ladder is provided with a platform 6. The stay legs 4 and 5 are provided with cross braces 8 and 9. The rails 2 and 3 are connected to the stay legs 4 and 5 by means of braces 10 and 11, which may be of usual construction. As shown, each of the braces 10 and 11 comprises links 12 and 13 which are hinged at 14 and 15 to the side rails and stay legs, as shown. Adjacent ends of the links are hinged together, as at 16.

The ladder is provided with steps 18, the construction of which is more particularly shown in FIGS. 2 and 3.

Each tread or step is formed of rigid extruded metal, such as aluminum or the like and is provided with a relatively broad tread portion 19 having downwardly projecting deep edge flanges 20 and 21 along opposite edges thereof. The tread portion 19 may be provided with ribs 22 which serve to strengthen the step and to prevent slippage when a person stands on the step.

On the underside of the tread 19 are integrally mounted pairs of curved or rounded parallel flanges 23—24 and 26—28. The pairs of flanges are mounted adjacent but spaced from the downwardly extending flanges 20 and 21. As shown most clearly in FIG. 2, the curved flanges 23 and 24 receive a tie rod 31 and the flanges 26—28 receive a similar tie rod 32. As is shown in FIGS. 1 and 2, the tie rods extend through the side rails 2 and 3. Each end of each tie rod carries a washer 34 and a nut 36, threaded on the tie rod. The washers engage outer faces of the side rails 2 and 3 so that, when the nuts 36 are tightened, the side rails are drawn and compressed against ends of the steps. As shown most clearly in FIG. 2, the deep edge flanges 20 and 21 are constructed to be aligned with lengthwise edges of the rails 2 and 3.

The tie rods 31 and 32 may be of steel wire or the like and immediately underlie and serve to support the tread portion of the step.

The stepladder construction illustrated in the drawing and described above is subject to structural modification without departing from the spirit and scope of the appended claim.

Having described my invention, what I claim as new and desire to secure by Letters Patent is:

A ladder which comprises a pair of side rails, a plurality of rigid step members spanning said rails, each of said step members comprising a tread portion, pairs of closely spaced parallel, downwardly projecting flanges integral with the underside of the tread portion, there being a pair of said flanges adjacent each lengthwise edge of the tread portion to form a pair of downwardly opening channels underneath the tread portion, and a pair of tension rods underlying the tread portion, each of said tension rods being received in one of said channels, whereby said rods are prevented from shifting toward or away from one another, the tension rods linking the rails to hold the rails in tight engagement with ends of the step members, edges of the flanges of each channel extending toward each other and underlying the rod received therein, whereby the tension rods are embraced by the flanges to hold the tread portion and tension rods in firmly assembled relation, the tread portion resting on the tension rods.

References Cited in the file of this patent
UNITED STATES PATENTS

| | | |
|---|---|---|
| 2,104,987 | Harding | Jan. 11, 1938 |
| 2,265,735 | Lambert | Dec. 9, 1941 |
| 2,432,206 | Mott | Dec. 9, 1947 |
| 2,488,633 | Linder et al. | Nov. 22, 1949 |
| 2,528,317 | Newman et al. | Oct. 31, 1950 |
| 2,665,951 | Bobst | Jan. 12, 1954 |
| 2,844,292 | Rich | July 22, 1958 |